Aug. 20, 1935.   N. P. SJOBRING   2,011,878
ROLLER BEARING
Filed July 17, 1933
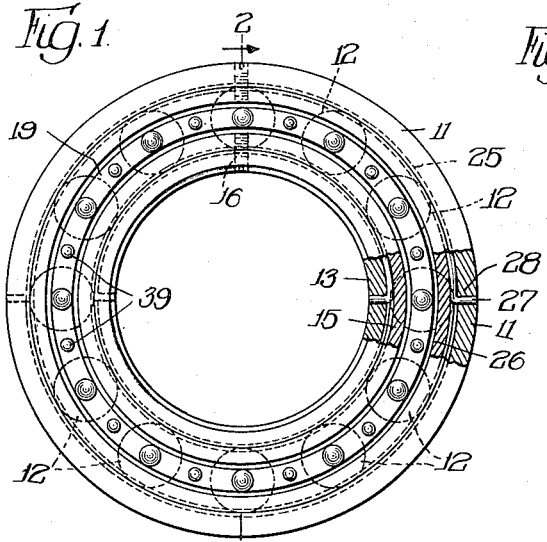
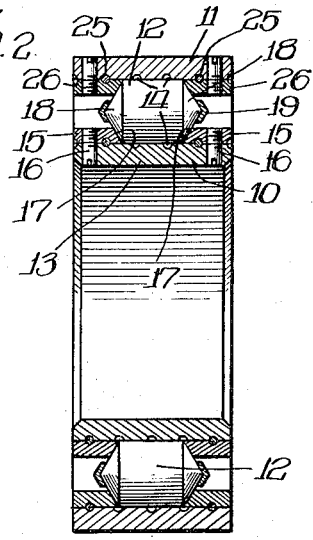
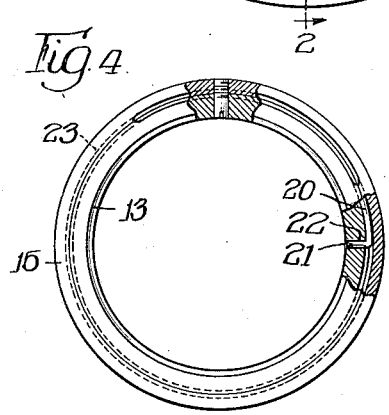
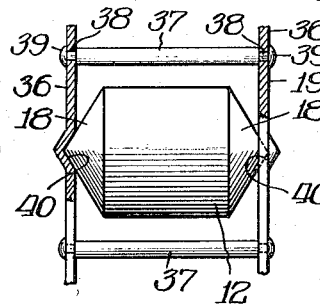
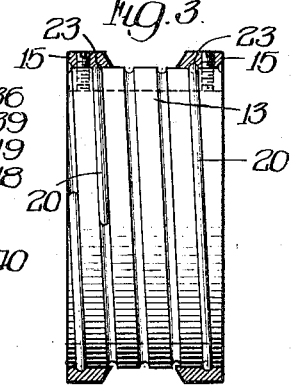
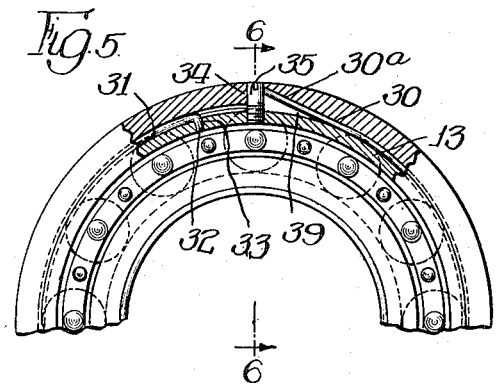
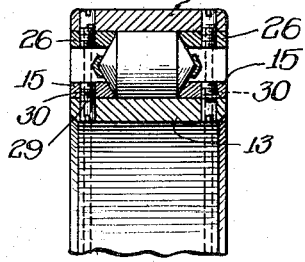
Inventor.
Nels P. Sjobring,
By Wilkinson Huxley Byron & Knight
attys.

Patented Aug. 20, 1935

2,011,878

UNITED STATES PATENT OFFICE 2,011,878

ROLLER BEARING

Nels P. Sjobring, Chicago, Ill.

Application July 17, 1933, Serial No. 680,733

12 Claims. (Cl. 308—216)

The present invention relates to roller bearings.

More particularly the present invention relates to roller bearing assemblies adapted to carry rotating loads having either a radial thrust, a longitudinal thrust, or both.

This application is a continuation-in-part of application Serial No. 455,080, entitled Roller bearings, filed May 23, 1930, by the present applicant.

An object of the present invention is to provide a roller bearing assembly which may be accurately and sturdily constructed at a minimum of cost.

A further object is to provide a roller bearing assembly having a high efficiency and which may be cheaply constructed of simple parts.

A further object is to provide a roller bearing assembly having the advantages that machining and assembly are simplified over former practice.

Further objects will appear as the description proceeds.

Referring to the drawing—

Figure 1 is an end view, parts being broken away, of a roller bearing assembly embodying the principles of the present invention;

Figure 2 is a sectional view taken along the plane indicated by the arrows 2—2 of Figure 1;

Figure 3 is a view, parts being broken away, of the inner race of the assembly shown in Figures 1 and 2;

Figure 4 is an end view of the structure shown in Figure 3, parts being broken away;

Figure 5 is an end view of a slight modification of the structure shown in the preceding figures;

Figure 6 is a sectional view taken along the arrows 6—6 of Figure 5; and

Figure 7 is a fragmentary view illustrating a cage and one of the rollers which may be used in the practice of the present invention.

Referring first to the construction illustrated in Figures 1, 2, 3, and 4, the numeral 10 indicates as a whole an inner race and the numeral 11 indicates as a whole an outer race, said races 10 and 11 being annular constructions, the outer bearing face of the inner race 10 and the inner bearing face of the outer race 11 being adapted to have contact with a plurality of spaced rollers 12—12.

The inner race 10 includes the race member or ring 13, which is machined off upon its outer periphery with a cylindrical surface, which cylindrical surface is in the construction illustrated in Figures 1, 2, 3, and 4 provided with a spiral, substantially semi-circular groove indicated by the numeral 14. Secured to the ring 13 at the two side edges thereof are a pair of thrust shoulders 15—15 secured to the ring 13 by means of the pins or screws 16—16. Said thrust shoulders 15—15 are beveled off, as indicated by the numerals 17—17, the beveled surfaces 17—17 diverging outwardly from the ring 13. The rollers 12—12 are provided with cone-shaped extremities 18—18, the angularity of said cone-shaped extremities corresponding to the inclination of the surfaces 17—17 of the thrust shoulders 15—15. The apexes of the cone-shaped surfaces 18—18 of the rollers 12 are located within oppositely disposed indentations in a cage 19 illustrated in Figure 7. The details of said cage will be described presently, it being sufficient to state at this point that said cage provides spacing means for the rollers to hold said rollers in predetermined spaced relationship around the outer periphery of the ring 13.

According to the structure illustrated in Figures 1, 2, 3, and 4, spiral wire means are provided for simplifying the positioning and the holding of the thrust shoulders 15—15 axially of the roller bearings. Figure 3 shows two of these spiral wire means, one located adjacent to each end of the ring 13. Each of said spiral wire means is indicated by the numeral 20. Each spiral wire means 20 is threaded within the spiral groove 14. One extremity of each of said spiral wire means is provided with an in-turned end, indicated by the numeral 21, disposed within a corresponding radial aperture 22 in the ring 13. It will be understood, of course, that the in-turned end 21 of each spiral wire means 20 will locate said spiral wire means relative to the ring member 13. Each of the thrust shoulders 15 is provided with a spiral, substantially semi-circular groove, indicated by the numeral 23, corresponding to the pitch of the spiral groove 14. It will be understood without detailed explanation that with the two spiral wire means 20 in position within the spiral groove 14 of the ring member 13, a pair of threads are provided at each end of the ring member 13 upon which the thrust shoulders 15 may be screwed. The set-screws or equivalent means 16—16 are provided, which may extend through the ring member 13 and the thrust shoulders 15 to hold said thrust shoulders 15 against movement when they have been properly located upon the ring member 13.

The outer ring member 11 is likewise provided with a spiral, substantially semi-circular groove 14 adapted to receive a pair of spiral wire members, indicated by the numerals 25—25. Thrust shoulders 26—26 are provided having spiral, substantially semi-circular grooves in their outer peripheries corresponding in pitch to the spiral wire members 25—25, whereby said thrust shoulders 26—26 may be screwed upon the spiral wire members 25—25 in connection with the thrust shoulders 15—15. Said spiral wire members 25—25 are provided with out-turned ends 27—27 located within radial apertures 28 in the outer ring 11. Setscrews 16—16 are provided in the outer ring 11 to hold the thrust shoulders 26—26 against movement when they have been properly located upon the ring member 11.

Referring now to the modification illustrated in Figures 5 and 6, the inner ring member 13 is provided on its inner periphery with a pair of endless grooves, indicated by the numerals 29—29. Each of the thrust shoulders 15 is provided with a corresponding endless groove 30. In connection with each thrust shoulder 15, a wire 31 is provided having an inturned end 32 disposed within a radial aperture 33 in the ring member 13. As illustrated in Figure 5, the groove 30 is flared outwardly, as indicated by the numeral 30a, adjacent to a radial aperture 34, which flared aperture is adapted to receive a set-screw 35 adapted to be threaded into the inner ring member 13.

With a thrust shoulder 15 disposed upon the inner ring member 13 in such a position that the endless grooves 29 and 30 of the ring member 13 and the thrust shoulder 15, respectively, coincide with each other, said ring 13 and shoulder 15 will be circumferentially adjusted so that the aperture 33 in said member 13 will be located a short distance to the right of the aperture 34 as the parts are viewed in Figure 5. The inturned end 32 of the wire 31 will be located within the aperture 33, and relative rotation will be effected between the ring member 13 and the corresponding thrust shoulder 15, to the end that said ring 13 will be turned in a clockwise direction relative to the shoulder 15 as the parts are viewed in Figure 5, drawing the flexible wire 13 into the space provided by the cooperating grooves 29 and 30 until the parts have reached a position approximating that shown in Figure 5. The setscrew 35 will then be threaded into the screw-threaded member 13, whereby the member 13 and the shoulder 15 will be securely fixed relative to each other. The outer ring 15 may be secured to its corresponding thrust shoulders 26—26 by a construction similar to that immediately above described in connection with the inner ring member 13.

As referred to above, the rollers 12—12 are held in predetermined spaced relationship with each other by means of the cage 19. Said cage 19 may assume a variety of forms, depending upon the choice of the user. The particular cage illustrated comprises a pair of annular members 36—36 held in proper spaced relationship by means of the cross pins 37—37. Said pins 37—37 may have reduced ends 38—38 fitting within corresponding holes in the annular members 36—36, the shoulders provided by said reduced portions 38—38 constituting abutments for positively locating said annular members 36—36 relative to each other. The ends of said reduced portions 38—38 may be riveted over, as indicated by the numerals 39—39, to hold the annular members 36—36 in fixed relationship with each other. Said annular members 36—36 are provided with a plurality of spaced indentations, indicated by the numerals 40—40, for receiving and holding the conical extremities 18—18 of the rollers 12. By the simple structure illustrated and described, the rollers 12—12 will be efficiently held in predetermined spaced relationship.

It will be understood without detailed explanation that the objects above set forth are accomplished by the construction illustrated and described, it being a very simple matter to machine the bearing surfaces of the members 11, 13, 15 and 26 and to locate said members 15 and 26 with respect to the members 13 and 11, respectively. By reason of the simplicity of accurately machining the bearing surfaces an efficient roller bearing assembly may be provided at a minimum of cost.

Though a preferred embodiment of the present invention has been described in detail, many modifications will occur to those skilled in the art. It is intended to cover all such modifications that fall within the scope of the appended claims.

What is claimed is—

1. In a roller bearing, in combination, an inner race member having a cylindrical surface, an outer race member having a cylindrical surface, race members being free of radial projections extending toward the space between said race members, rollers between said race members, and separable thrust shoulders secured to said race members on the cylindrical bearing surfaces of said race members and having cooperating thrust relationship with said rollers, certain of said thrust shoulders being adjustable axially of said roller bearing.

2. In a roller bearing, in combination, an inner race member and an outer race member, said race members having cooperating cylindrical surfaces, said race members being free of radial projections extending toward the space between said race members, rollers between said race members, said rollers having conical extremities, means for holding said rollers in spaced relationship with each other, and separable thrust shoulders secured to said race members on the cylindrical bearing surfaces of said race members, said thrust shoulders having beveled surfaces cooperating with the conical extremities of said rollers, certain of said thrust shoulders being adjustable axially of said roller bearing.

3. In a roller bearing, a race member having a cylindrical bearing surface extending completely thereacross and having a spiral groove in said surface extending completely across said race member, an elongated member in said groove and extending beyond said cylindrical surface, a thrust shoulder having a groove coincident with said first-mentioned groove receiving said elongated member, and means for preventing relative rotation between said cylindrical member and said thrust shoulder.

4. In a ball bearing, in combination, a race member having a cylindrical bearing surface, said cylindrical bearing surface being spirally grooved from one end to the other thereof, a pair of thrust shoulders disposed upon said cylindrical surface, said thrust shoulders being spaced apart, said thrust shoulders being provided with spiral grooves cooperating with the spirally grooved portion of said race member, and elongated members disposed in said grooves and in the grooved portion of said race member for holding said thrust shoulders against movement longitudinally of said bearing with respect to said race member.

5. In a ball bearing, in combination, a race member having a cylindrical surface extending entirely thereacross, said race member having a substantially semi-circular spiral groove in said cylindrical surface, a thrust shoulder having a surface adapted to bear against the cylindrical surface of said race member, said thrust shoulder having a spiral substantially semi-circular groove complementary to the groove in said race member, and an elongated member disposed within said semi-circular grooves to locate said thrust shoulder relative to said race member.

6. In a roller bearing, in combination, an inner race, an outer race, rollers between said races, each of said races including a race member having uniform diameter throughout its length longitudinally of said roller bearing, thrust shoulders at each end of each of said race members, said shoulders being separable from their respective race members, said race members and said thrust shoulders having cooperating complementary spiral grooves, and elongated members located in said grooves to locate said thrust shoulders relative to said race members.

7. In a roller bearing, in combination, a race member, said race member having a uniform diameter throughout its length longitudinally of said roller bearing, a thrust shoulder adjacent to one end of said race member, said shoulder being separable from said race member, said race member and said thrust shoulder having cooperating complementary spiral grooves, and an elongated member located in said grooves to locate said thrust shoulder relative to said race member.

8. In a roller bearing, in combination, a race member having a bearing surface of uniform diameter, a thrust shoulder disposed upon said surface, said race member and said thrust shoulder having coinciding semi-circular spiral grooves providing a circular groove, and an elongated member disposed within said circular groove, said elongated member having one of its extremities turned into said race member.

9. In a roller bearing, in combination, an inner race member, an outer race member, said race members having cylindrical surfaces extending completely across said race members, rollers between said race members, a cage for holding said rollers in spaced relationship relative to one another, said race members having spiral semi-circular grooves in their cylindrical surfaces, thrust shoulders secured to said race members in contact with said cylindrical surfaces, said thrust shoulders having spiral, semi-circular grooves coinciding in pitch with said first-mentioned semi-circular grooves, and elongated members within said grooves for locating said shoulders relative to said race members.

10. In a roller bearing, in combination, an inner race member and an outer race member, each of said race members having cylindrical bearing surfaces extending the full distance across said race members and being free of radial projections extending toward the space between said race members, each of said race members having a spiral groove in its bearing surface from one extreme end to the other thereof, thrust members bearing against said cylindrical bearing surfaces, said thrust members having spiral grooves coinciding with the spiral grooves in the bearing surfaces of said race members, rollers between said bearing surfaces, and means for holding said rollers in spaced relationship to each other.

11. In a roller bearing, in combination, an inner race member and an outer race member, said race members having cooperating cylindrical surfaces, rollers between said race members, said rollers having conical extremities, means for holding said rollers in spaced relationship with each other comprising a cage for receiving said conical extremities, and separable thrust shoulders secured to said race members on the cylindrical bearing surfaces of said members, said thrust shoulders having bearing surfaces cooperating with the conical extremities of said rollers, certain of said thrust shoulders being adjustable axially of said roller bearing.

12. In a roller bearing, in combination, an inner race member and an outer race member, rollers between said race members, said rollers having conical extremities, means for holding said rollers in spaced relationship with each other comprising a cage having conical recesses for receiving said conical extremities, and thrust shoulders secured to said race members, said thrust shoulders having beveled surfaces cooperating with the conical extremities of said rollers, certain of said thrust shoulders being adjustable axially of said roller bearing.

NELS P. SJOBRING.